(12) United States Patent
Yang et al.

(10) Patent No.: US 12,543,170 B2
(45) Date of Patent: Feb. 3, 2026

(54) DELAY SENSITIVE UPLINK TRANSMISSIONS

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 18/003,101

(22) PCT Filed: Aug. 21, 2020

(86) PCT No.: PCT/CN2020/110410
§ 371 (c)(1),
(2) Date: Dec. 22, 2022

(87) PCT Pub. No.: WO2022/036664
PCT Pub. Date: Feb. 24, 2022

(65) Prior Publication Data
US 2023/0254846 A1     Aug. 10, 2023

(51) Int. Cl.
*H04W 72/1268* (2023.01)
*H04W 72/21* (2023.01)
*H04W 72/566* (2023.01)

(52) U.S. Cl.
CPC ....... *H04W 72/1268* (2013.01); *H04W 72/21* (2023.01); *H04W 72/566* (2023.01)

(58) Field of Classification Search
None
See application file for complete search history.

(56) References Cited

U.S. PATENT DOCUMENTS

| 2014/0126399 A1 | 5/2014 | Damnjanovic et al. |
| 2014/0237276 A1* | 8/2014 | Machnicki ............ G06F 1/3296 713/323 |

(Continued)

FOREIGN PATENT DOCUMENTS

| CN | 108401302 A | 8/2018 |
| CN | 110178435 A | 8/2019 |

(Continued)

OTHER PUBLICATIONS

Qualcomm, "Enhancements to SR in NR", May 15-19, 2017, 3GPP TSG-RAN WG2 Meeting #98, R2-170xxxx, pp. 1-4 (Year: 2017).*

(Continued)

*Primary Examiner* — Steve R Young
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, an uplink request including an indication that data associated with the uplink request is delay sensitive. The UE may receive, from the base station, an uplink grant associated with a logical channel group including a logical channel for the data, wherein the logical channel group is associated with a higher priority than one or more other logical channel groups. The UE may transmit, to the base station and using the logical channel, the data, based at least in part on the uplink grant. Numerous other aspects are provided.

33 Claims, 11 Drawing Sheets

(56) References Cited

U.S. PATENT DOCUMENTS

| | | | |
|---|---|---|---|
| 2015/0277964 A1* | 10/2015 | Atkins | G06Q 40/00 718/101 |
| 2018/0279353 A1* | 9/2018 | Shaheen | H04W 72/21 |
| 2018/0324832 A1 | 11/2018 | He et al. | |
| 2018/0373671 A1* | 12/2018 | Bernat | G06F 12/084 |
| 2019/0182896 A1 | 6/2019 | Shrestha et al. | |
| 2020/0128051 A1* | 4/2020 | Sondhi | G06N 20/00 |
| 2020/0137785 A1* | 4/2020 | Deogun | H04W 72/21 |

FOREIGN PATENT DOCUMENTS

| | | |
|---|---|---|
| CN | 110771245 A | 2/2020 |
| EP | 3603287 A1 | 2/2020 |
| WO | 2016119160 A1 | 8/2016 |
| WO | 2018175919 | 9/2018 |
| WO | 2018232034 A1 | 12/2018 |

OTHER PUBLICATIONS

Qualcomm Incorporated: "Enhancements to SR in NR," 3GPP TSG-RAN WG2 Meeting #98, R2-1704900, 3rd Generation Partnership Project (3GPP), Mobile Competence Centre, 650, Route Des Lucioles, F-06921 Sophia-Antipolis Cedex, France, vol. RAN WG2, No., Hangzhou, China, May 15, 2017-May 19, 2017, May 4, 2017, XP051263640, May 14, 2017, pp. 1-4, the Whole Document, paragraphs [2.2.1]-[2.2.2], sections 2.1, 2.2, 3, p. 1-p. 4.

Supplementary European Search Report—EP20949874—Search Authority—The Hague—Apr. 4, 2024.

Intel Corporation: "Scheduling Request Design for NR", 3GPP TSG-RAN WG1 #86bis, 3GPP Draft; R1-1610191, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, 5 Pages, XP051150211, Oct. 14, 2016 (Oct. 14, 2016) the whole document.

Intel Corporation: "Enhancements to SR Targeting Low Latency Requirements", 3GPP TSG RAN WG1 Meeting #89, R1-1707406, Intel SR URLLC, 3rd Generation Partnership Project, Mobile Competence Centre, 650, Route Des Lucioles, F-06921 Sophia-Antipolis Cedex, France, vol. RAN WG1, No. Hangzhou, P.R. China, May 15, 2017-May 19, 2017, May 14, 2017, XP051272616, 20170507, pp. 1-5, sections 1-3, Chapters 1 to 2.

International Search Report and Written Opinion—PCT/CN2020/110410—ISA/EPO—May 20, 2021.

\* cited by examiner

12,543,170 B2

DELAY SENSITIVE UPLINK TRANSMISSIONS

CROSS-REFERENCE TO RELATED APPLICATION

This application is a 35 U.S.C. 371 national stage application of PCT Application No. PCT/CN2020/110410, filed on Aug. 21, 2020, entitled "DELAY SENSITIVE UPLINK TRANSMISSIONS," which is expressly incorporated by reference herein.

FIELD OF THE DISCLOSURE

Aspects of the present disclosure generally relate to wireless communication and to techniques and apparatuses for transmitting and receiving delay sensitive uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting, to a base station, an uplink request including an indication that data associated with the uplink request is delay sensitive; receiving, from the base station, an uplink grant associated with a logical channel group including a logical channel for the data, wherein the logical channel group is associated with a higher priority than one or more other logical channel groups; and transmitting, to the base station and using the logical channel, the data, based at least in part on the uplink grant.

In some aspects, a method of wireless communication performed by a base station includes: receiving, from a UE, an uplink request including an indication that data associated with the uplink request is delay sensitive; transmitting, to the UE, an uplink grant associated with a logical channel group including a logical channel for the data, wherein the logical channel group is associated with a higher priority than one or more other logical channel groups; and receiving, from the UE and using the logical channel, the data, based at least in part on the uplink grant.

In some aspects, a UE for wireless communication includes a memory and one or more processors operatively coupled to the memory, the memory and the one or more processors configured to: transmit, to a base station, an uplink request including an indication that data associated with the uplink request is delay sensitive; receive, from the base station, an uplink grant associated with a logical channel group including a logical channel for the data, wherein the logical channel group is associated with a higher priority than one or more other logical channel groups; and transmit, to the base station and using the logical channel, the data, based at least in part on the uplink grant.

In some aspects, a base station for wireless communication includes a memory and one or more processors operatively coupled to the memory, the memory and the one or more processors configured to: receive, from a UE, an uplink request including an indication that data associated with the uplink request is delay sensitive; transmit, to the UE, an uplink grant associated with a logical channel group including a logical channel for the data, wherein the logical channel group is associated with a higher priority than one or more other logical channel groups; and receive, from the UE and using the logical channel, the data, based at least in part on the uplink grant.

In some aspects, a non-transitory computer-readable medium storing a set of instructions for wireless communication includes one or more instructions that, when executed by one or more processors of a UE, cause the UE to: transmit, to a base station, an uplink request including an indication that data associated with the uplink request is delay sensitive; receive, from the base station, an uplink grant associated with a logical channel group including a logical channel for the data, wherein the logical channel group is associated with a higher priority than one or more other logical channel groups; and transmit, to the base station and using the logical channel, the data, based at least in part on the uplink grant.

In some aspects, a non-transitory computer-readable medium storing a set of instructions for wireless communication includes one or more instructions that, when executed by one or more processors of a base station, cause the base station to: receive, from a UE, an uplink request including an indication that data associated with the uplink request is delay sensitive; transmit, to the UE, an uplink grant associated with a logical channel group including a logical channel for the data, wherein the logical channel group is associated with a higher priority than one or more other logical channel groups; and receive, from the UE and using the logical channel, the data, based at least in part on the uplink grant.

In some aspects, an apparatus for wireless communication includes: means for transmitting, to a base station, an uplink request including an indication that data associated with the uplink request is delay sensitive; means for receiving, from the base station, an uplink grant associated with a logical channel group including a logical channel for the data, wherein the logical channel group is associated with a higher priority than one or more other logical channel groups; and means for transmitting, to the base station and using the logical channel, the data, based at least in part on the uplink grant.

In some aspects, an apparatus for wireless communication includes: means for receiving, from a UE, an uplink request including an indication that data associated with the uplink request is delay sensitive; means for transmitting, to the UE, an uplink grant associated with a logical channel group including a logical channel for the data, wherein the logical channel group is associated with a higher priority than one or more other logical channel groups; and means for receiving, from the UE and using the logical channel, the data, based at least in part on the uplink grant.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
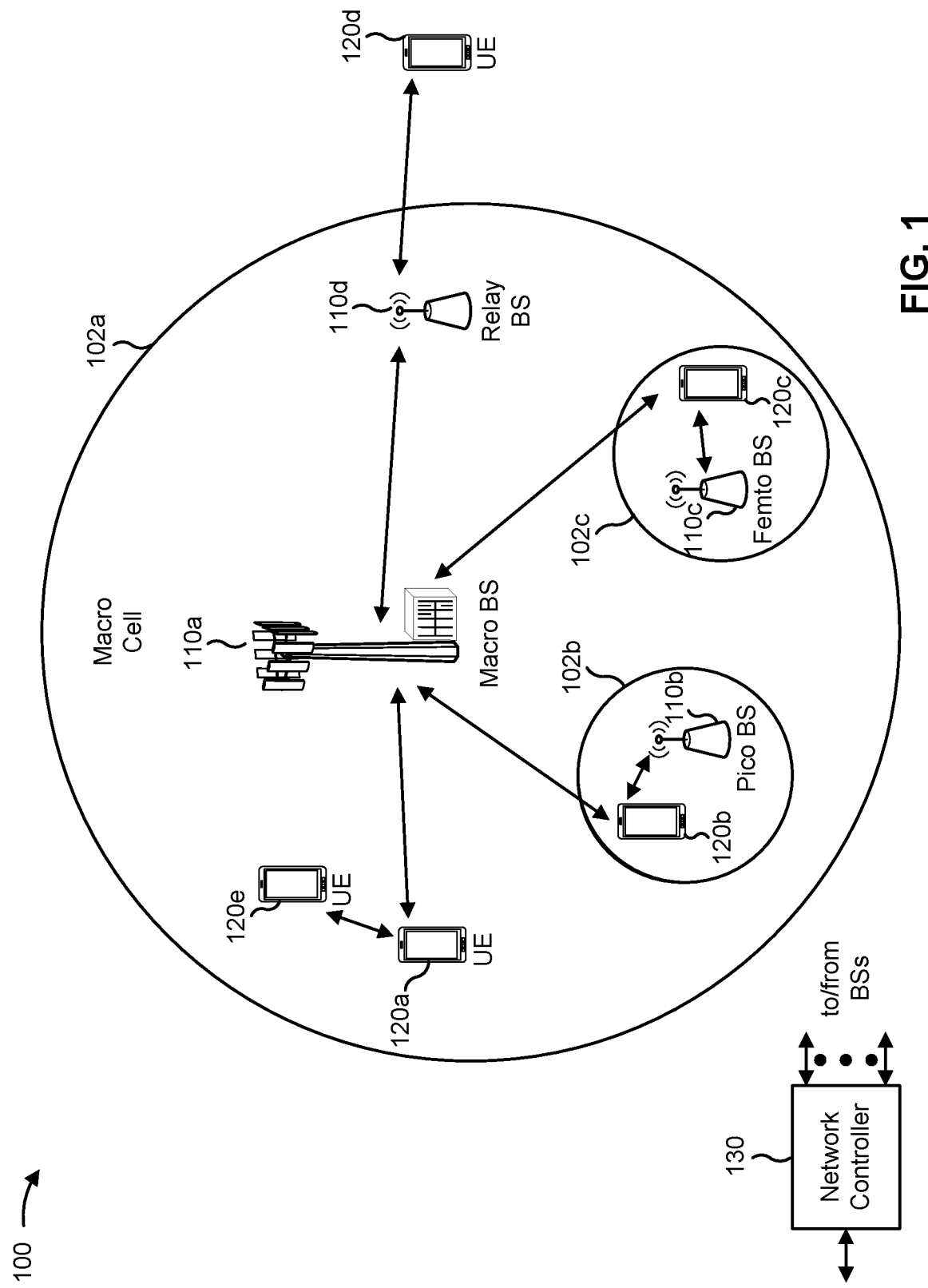
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
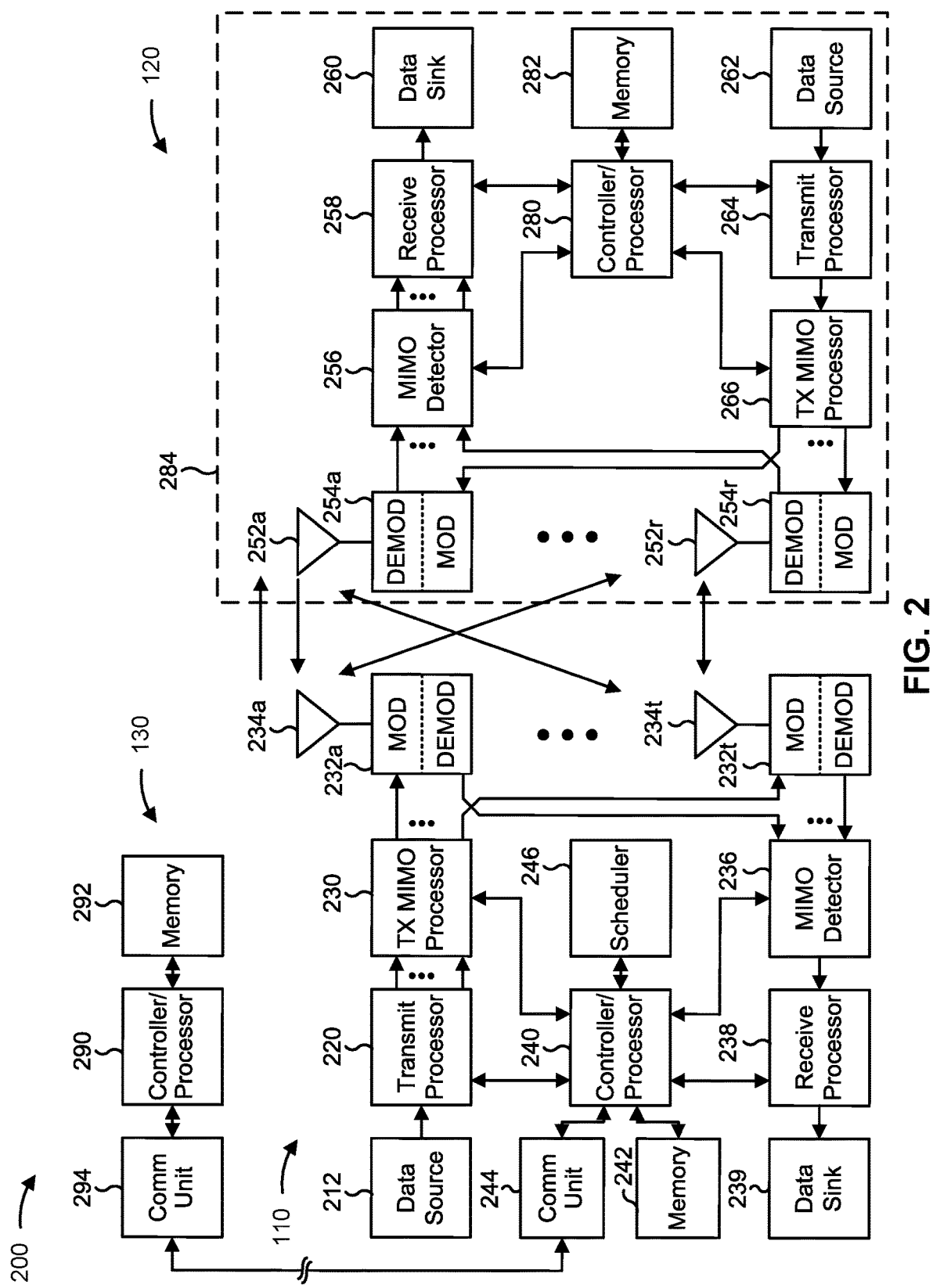
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with transmitting and receiving delay sensitive uplink transmissions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, a UE (e.g., UE 120, apparatus 800 of FIG. 8, and/or the like) may include means for transmitting, to a base station (e.g., base station 110, apparatus 900 of FIG. 9, and/or the like), an uplink request including an indication that data associated with the uplink request is delay sensitive; means for receiving, from the base station, an uplink grant associated with a logical channel group including a logical channel for the data, wherein the logical channel group is associated with a higher priority than one or more other logical channel groups; means for transmitting, to the base station and using the logical channel, the data, based at least in part on the uplink grant; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a base station (e.g., base station 120, apparatus 900 of FIG. 9, and/or the like) may include means for receiving, from a UE (e.g., UE 120, apparatus 800 of FIG. 8, and/or the like), an uplink request including an indication that data associated with the uplink request is delay sensitive; means for transmitting, to the UE, an uplink grant associated with a logical channel group including a logical channel for the data, wherein the logical channel group is associated with a higher priority than one or more other logical channel groups; means for receiving, from the UE and using the logical channel, the data, based at least in part on the uplink grant; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
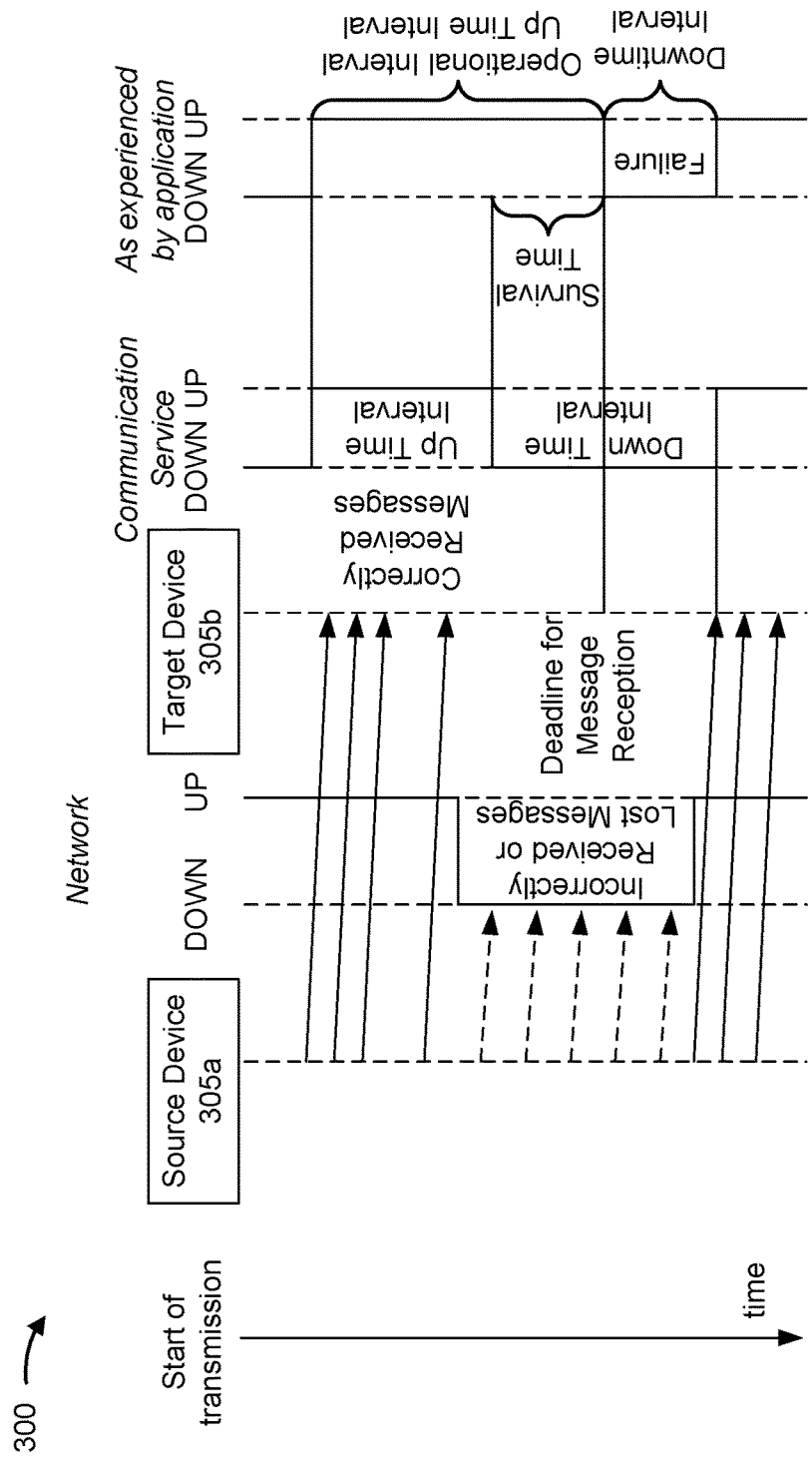
FIGS. 3A and 3B are diagrams illustrating examples of delay sensitivity, in accordance with various aspects of the present disclosure.

FIG. 3A is a diagram illustrating an example 300 of delay sensitivity, in accordance with various aspects of the present disclosure. As shown in FIG. 3A, a source device 305*a* may transmit messages that are delay sensitive to a target device 305*b*. In some aspects, the source device 305*a* and the target device 305*b* may communicate on a wireless network, such as wireless network 100.

As shown in FIG. 3A, messages may be successfully transmitted when the network is functional (shown as "UP" in FIG. 3A). Messages may fail when the network is not functioning (shown as "DOWN" in FIG. 3A), when the target device 305*b* fails to receive messages due to low signal strength, and/or the like. Therefore, the network or other communication service may experience an up time interval when messages are received by the target device 305*b* and a down time interval when messages are lost or otherwise not received by the target device 305*b*.

An application executed by the source device 305*a* and/or the target device 305*b* may be delay sensitive. Accordingly, the messages may be time-sensitive for particular operations such that the application transitions to a downtime or failure state when a deadline for message reception is not met. As shown in FIG. 3A, the deadline may be indicated by a survival time between a last-received message and a transition to the downtime or failure state. The survival time may be a period of time or a number of messages that are incorrectly received (e.g., unable to be decoded by the target device 305*b*) or not received by the target device 305*b* (e.g., indicated by a non-acknowledgment (NACK) signal from the target device 305*b*).

As indicated above, FIG. 3A is provided as an example. Other examples may differ from what is described with respect to FIG. 3A.

Figure 3B:
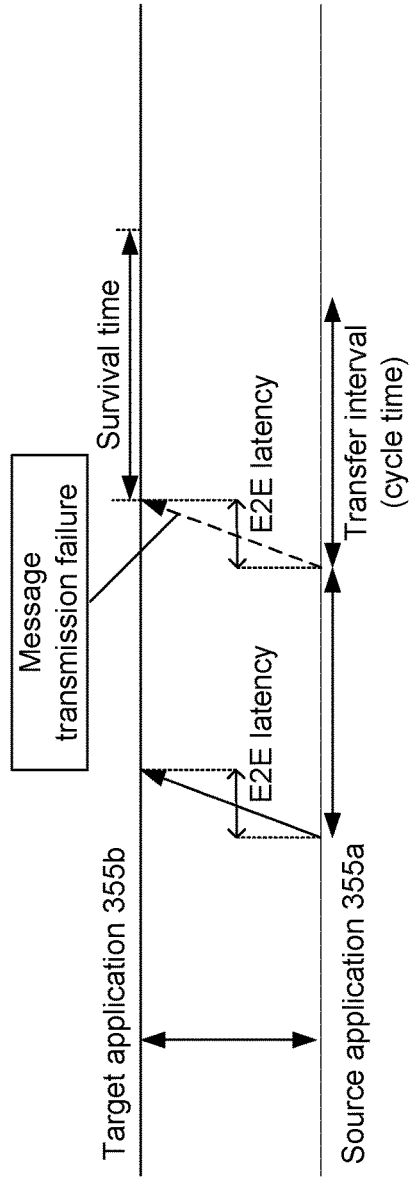

FIG. 3B is a diagram illustrating an example 350 of delay sensitivity, in accordance with various aspects of the present disclosure. As shown in FIG. 3B, an application 355*a* on a source device may transmit messages that are delay sensitive to a target application 355*b* on a target device. In some aspects, the source application 355*a* and the target application 355*b* may communicate on a wireless network, such as wireless network 100.

As shown in FIG. 3B, the source application 355*a* and/or the target application 355*b* may be delay sensitive in a stringent use case. Accordingly, the survival time may be a transfer interval (e.g., a cycle time for cyclical traffic between the source application 355*a* and the target application 355*b* and/or the like) or a single failed message. In some aspects, the target application 355*b* and/or the source application 355*a* may account for end-to-end latency ("E2E latency") between transmission of a message by the source application 355*a* and reception thereof by the target application 355*b* in determining the survival time associated with the stringent use delay sensitivity.

A base station may be aware when an application executed by a UE is delay sensitive for downlink communications. However, a base station may be unaware when the application is delay sensitive for uplink communications. Accordingly, the base station may fail to provide an uplink grant to the UE, and the application, that is delay sensitive on the uplink, may transition to a downtime or failure state. The application may then consume additional processing and/or network resources to transition out of the downtime or failure state after the uplink grant is provided to the UE.

Techniques and apparatuses described herein allow a UE (e.g., UE 120, apparatus 800 of FIG. 8, and/or the like) to indicate to a base station (e.g., base station 110, apparatus 900 of FIG. 9, and/or the like) that an uplink request is associated with one or more messages that are delay sensitive. Accordingly, the UE 120 and the base station 110 may reduce latency for uplink communications that are delay sensitive (e.g., associated with a survival time). Additionally, in some aspects, the UE 120 may request, and the base station 110 may provide, an uplink grant without a BSR. Accordingly, the UE 120 and the base station 110 may further reduce latency as well as signaling overhead for uplink communications that are delay sensitive.

As indicated above, FIG. 3B is provided as an example. Other examples may differ from what is described with respect to FIG. 3B.

Figure 4:
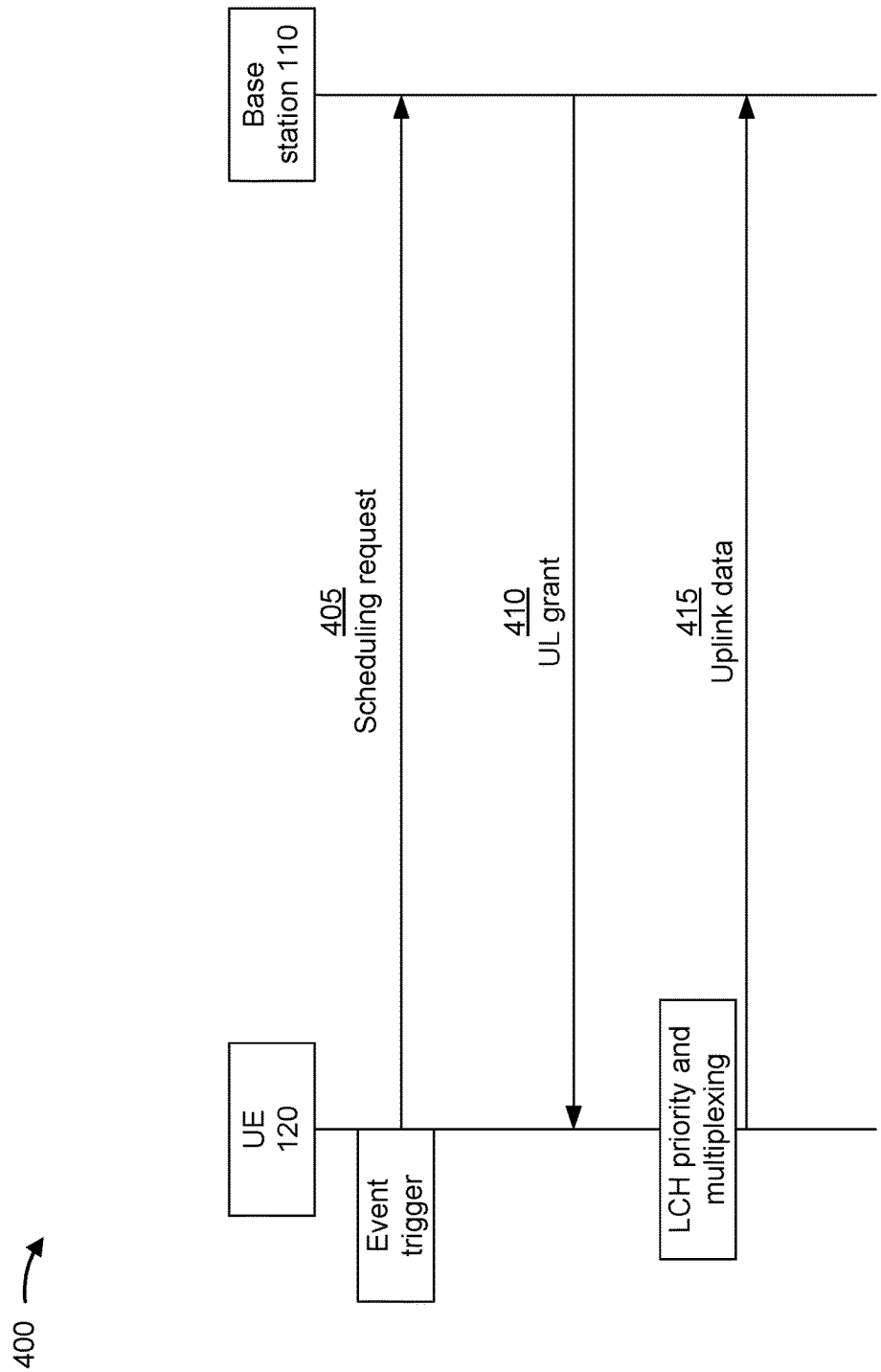
FIG. 4 is a diagram illustrating an example associated with transmitting and receiving delay sensitive uplink transmissions, in accordance with various aspects of the present disclosure.

FIG. 4 is a diagram illustrating an example 400 associated with transmitting and receiving delay sensitive uplink transmissions, in accordance with various aspects of the present disclosure. As shown in FIG. 4, example 400 includes communication between a base station 110 and a UE 120. In some aspects, the base station 110 and the UE 120 may be included in a wireless network, such as wireless network 100.

As shown in FIG. 4, an event may trigger the UE 120 to request an uplink grant from the base station 110. For example, an application executed by the UE 120 may have data to transmit to the base station 110 (e.g., to a remote server and/or other destination using wireless network 100 that includes the base station 110) and request that a modem, other hardware, and/or other software of the UE 120 establish an uplink channel for transmitting the data.

In some aspects, the UE 120 may transmit, and the base station 110 may receive, an uplink request including an indication that data associated with the uplink request is delay sensitive. The UE 120 may transmit the uplink request based at least in part on the triggering event described above. In some aspects, the data may have an associated survival time (e.g., as described above in connection with FIGS. 3A and 3B).

As shown in connection with reference number 405, the uplink request may include a scheduling request. In some aspects, the scheduling request may be associated with a first data structure that is distinct from a second data structure associated with uplink requests for data that are not delay sensitive. For example, the scheduling request may be a schedulingRequestIDForTR data structure (e.g., as defined in 3GPP specifications and/or the like) that is distinct from the schedulingRequestID data structure (e.g., as defined in 3GPP specifications and/or the like). In some aspects, the first and second data structures may have the same format but remain distinct in classification.

In some aspects, the scheduling request may be a single bit indicating whether the scheduling request is positive or negative. As an alternative, the scheduling request may include a plurality of bits. Accordingly, the scheduling request may indicate that the data is delay sensitive, a size associated with the data, a time remaining for transmission of the data, and/or the like. For example, one bit may indicate whether the scheduling request is positive or negative, another bit may indicate whether the data is delay sensitive, one or more additional bits may indicate a size of the data, one or more additional bits may indicate a time remaining for transmission of the data (e.g., an amount of time remaining of a survival time as described above in connection with FIGS. 3A and 3B), and/or the like.

In some aspects, the scheduling request may include two or more bits that indicate the data is delay sensitive and a relative size associated with the data. For example, a scheduling request of "00" may indicate a negative scheduling request, a scheduling request of "11" may indicate a positive scheduling request with no delay sensitivity, a scheduling request of "01" may indicate a positive scheduling request for data of a smaller size (e.g., less than 1 MB and/or the like) with delay sensitivity, and a scheduling request of "10" may indicate a positive scheduling request for data of a larger size (e.g., more than 1 MB and/or the like) with delay sensitivity. Additionally, or alternatively, the scheduling request may include two or more bits that indicate a degree of delay sensitivity associated with the data. For example, a scheduling request of "00" may indicate a negative scheduling request, a scheduling request of "11" may indicate a positive scheduling request with no delay sensitivity, a scheduling request of "01" may indicate a positive scheduling request for data with high delay sensitivity (e.g., survival time of less than 10 ms and/or the like), and a scheduling request of "10" may indicate a positive scheduling request for data with low delay sensitivity (e.g., survival time of greater than 10 ms and/or the like).

In another example, a scheduling request of "000" may indicate a negative scheduling request, a scheduling request of "100" may indicate a positive scheduling request with no delay sensitivity, a scheduling request of "001" may indicate a positive scheduling request for data with high delay sensitivity (e.g., survival time of less than 10 ms and/or the like) and small size (e.g., less than 1 MB and/or the like), a scheduling request of "010" may indicate a positive scheduling request for data with high delay sensitivity and medium size (e.g., between 1 MB and 5 MB and/or the like), a scheduling request of "011" may indicate a positive scheduling request for data with high delay sensitivity and large size (e.g., greater than 5 MB and/or the like), a scheduling request of "101" may indicate a positive scheduling request for data with low delay sensitivity (e.g., survival time of greater than 10 ms and/or the like) and small size, a scheduling request of "110" may indicate a positive scheduling request for data with low delay sensitivity and medium size, and a scheduling request of "111" may indicate a positive scheduling request for data with low delay sensitivity and large size.

In another example, a scheduling request of "000" may indicate a negative scheduling request, a scheduling request of "100" may indicate a positive scheduling request with no delay sensitivity, a scheduling request of "001" may indicate a positive scheduling request for data with small size (e.g., less than 1 MB and/or the like) and low delay sensitivity (e.g., survival time of greater than 20 ms and/or the like), a scheduling request of "010" may indicate a positive scheduling request for data with small size and medium delay sensitivity (e.g., survival time between 10 ms and 20 ms and/or the like), a scheduling request of "011" may indicate a positive scheduling request for data with small size and high delay sensitivity (e.g., survival time of less than 10 ms and/or the like), a scheduling request of "101" may indicate a positive scheduling request for data with large size (e.g., greater than 1 MB and/or the like) and low delay sensitivity, a scheduling request of "110" may indicate a positive scheduling request for data with large size and medium delay sensitivity, and a scheduling request of "111" may indicate a positive scheduling request for data with large size and high delay sensitivity. Accordingly, based at least in part on a number of bits included in the scheduling request, the UE 120 may indicate a relative delay sensitivity within two, three, four, and/or more bins and/or a relative size, associated with the data, within two, three, four, and/or more bins.

In some aspects, the scheduling request may be encoded according to a physical uplink control channel (PUCCH) format that includes two or fewer bits. For example, the scheduling request may be encoded according to PUCCH Format 0 or PUCCH Format 1 for uplink control information (UCI) (e.g., as defined in 3GPP specifications and/or the like). As an alternative, the scheduling request may be encoded according to a PUCCH format that includes more than two bits. For example, the scheduling request may be encoded according to PUCCH Format 2, PUCCH Format 3, or PUCCH Format 4 for uplink control information (UCI) (e.g., as defined in 3GPP specifications and/or the like) and/or according to a new PUCCH Format (e.g., as defined in 3GPP specifications and/or the like).

In any of the aspects described above, the scheduling request may be associated with a logical channel (LCH). As used herein, an LCH may be a channel between a radio link control (RLC) layer and a medium access control (MAC) layer that facilitates downlink communications from the base station 110 to the UE 120 and uplink communications from the UE 120 to the base station 110. An LCH may reside in the control plane and carry control information or may reside in the user plane and carry data.

As an alternative to the scheduling request, the uplink request may include a BSR. For example, the UE 120 may transmit the BSR after receiving an uplink grant for the BSR from the base station 110. The BSR may indicate that data associated with the uplink request is delay sensitive as described below in connection with FIGS. 5A-5B.

As shown in connection with reference number 410, the base station 110 may transmit, and the UE 120 may receive, an uplink grant associated with a logical channel group (LCG) including the LCH for the data. As used herein, an LCG may group LCHs together such that the base station 110 and the UE 120 may reduce overhead by using indices for LCGs rather than individual LCHs. In some aspects, the LCG is associated with a higher priority than one or more other LCGs. For example, each LCH may be associated with two LCGs, where one of the two LCGs is associated with the higher priority and used when data intended for the LCH is delay sensitive.

In some aspects, the base station 110 may transmit the uplink grant without receiving a BSR from the UE 120. Accordingly, the uplink grant may include a size based at least in part on a size associated with data previously transmitted using the LCH. For example, the base station 110 may determine an average and/or median size of one or more previous uplink transmissions on the LCH and/or the LCG with the higher priority. Accordingly, the base station 110 may provide the uplink grant with a size based at least in part on the average and/or median size.

As shown in connection with reference number 415, the UE 120 may transmit, and the base station 110 may receive, the data, using the LCH and based at least in part on the uplink grant. For example, the UE 120 may transmit the data on a PUCCH within the LCG having higher priority. As further shown in FIG. 4, the UE 120 may multiplex the data based at least in part on the LCH and the higher priority of the LCG.

In some aspects, the data may be associated with periodic uplink transmissions from the UE 120. For example, the application may schedule periodic transmissions to a remote server and/or other entity using the wireless network 100 that includes the base station 110. Accordingly, the base station 110 may use the average and/or median size of the periodic uplink transmissions to determine a size for the uplink grant.

By using the technique described in connection with FIG. 4, the UE 120 may reduce latency in receiving the uplink grant from the base station 110. Additionally, the UE 120 may transmit the data to the base station 110 without transmitting a BSR, further reducing latency.

As indicated above, FIG. 4 is provided as an example. Other examples may differ from what is described with respect to FIG. 4.

Figure 5A:
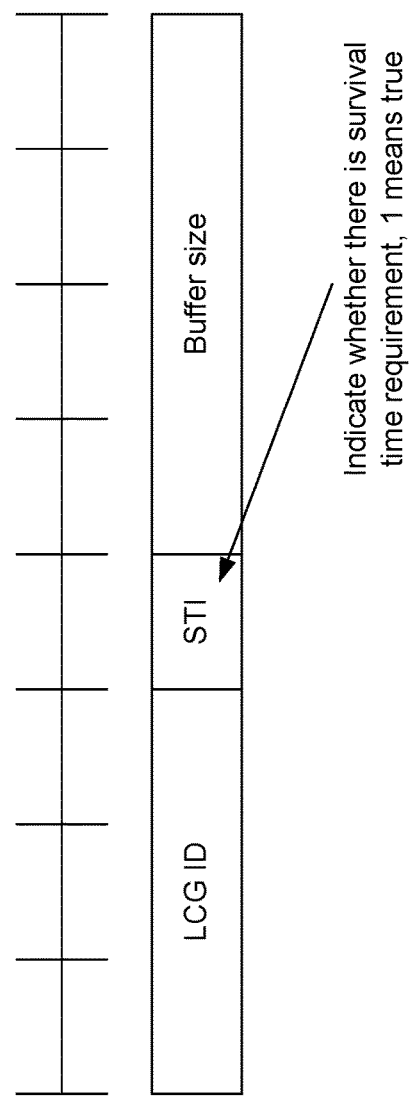
FIGS. 5A and 5B are diagrams illustrating examples associated with buffer status reports (BSRs) for delay sensitive uplink transmissions, in accordance with various aspects of the present disclosure.
Figure 5B:
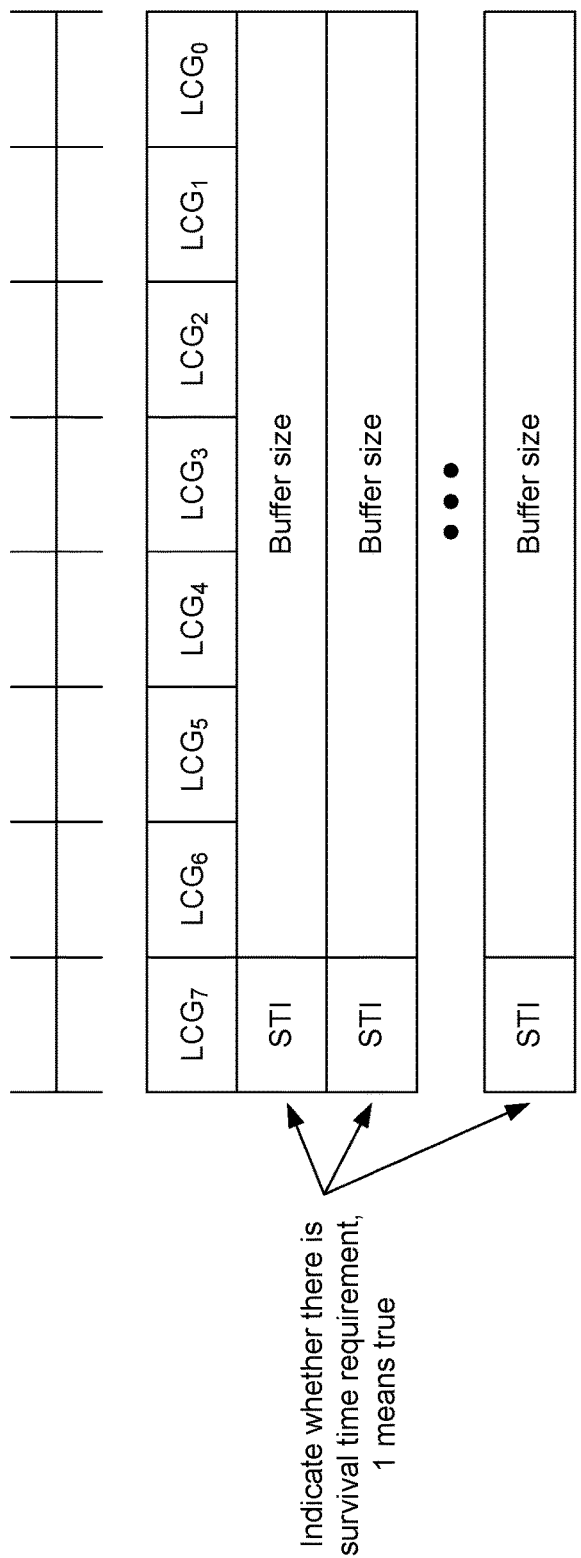

FIGS. 5A-5B are diagrams illustrating example 500 and example 550 associated with BSRs for delay sensitive uplink transmissions, in accordance with various aspects of the present disclosure. As shown in FIG. 5A, example 500 is a short BSR that includes a bit indicating that data associated with the short BSR is delay sensitive. Similarly, example 550 is a long BSR that includes one or more bits indicating that some or all data associated with the long BSR is delay sensitive.

As shown in FIG. 5A, the short BSR may include an identifier (e.g., an index and/or the like) of an LCG (e.g., the LCG having a higher priority, as described above in connection with FIG. 4). Additionally, the short BSR may include a bit indicating whether the data associated with the BSR is delay sensitive (e.g., the survival time indicator or STI as shown in FIG. 5A).

In some aspects, this bit may be included in a first bit reserved for a buffer size such that the buffer size bits are coarse. As an alternative, a table defining buffer sizes for BSRs (e.g., as provided in 3GPP specifications and/or the like) may be adjusted to allow space in the buffer size bits for the bit indicating whether the data associated with the BSR is delay sensitive.

As shown in FIG. 5B, the long BSR may include identifiers (e.g., indices and/or the like) of a plurality of LCGs (e.g., $LCG_0$, $LCG_1$, $LCG_2$, $LCG_3$, $LCG_4$, $LCG_5$, $LCG_6$, $LCG_7$, as shown in FIG. 5B). Additionally, the long BSR may include, for each LCG, a bit indicating whether the data associated with that LCG is delay sensitive (e.g., the survival time indicator or STI as shown in FIG. 5B).

Additionally with, or alternatively to, the bits described above, the UE 120 may use a parameter configured using radio resource control (RRC) to indicate that data associated with a BSR is delay sensitive. For example, the UE 120 may include LCGIDforTR (e.g., as defined by 3GPP specifications and/or the like) and/or another similar parameter to indicate that an LCG identified by the BSR is for data that is delay sensitive.

By using the technique described in connection with FIGS. 5A-5B, the UE 120 may reduce latency in receiving the uplink grant from the base station 110. Additionally, the UE 120 may use the BSR to indicate delay sensitivity for traffic that is not periodic or otherwise predictable in size.

As indicated above, FIGS. 5A-5B are provided as examples. Other examples may differ from what is described with respect to FIGS. 5A-5B.

Figure 6:
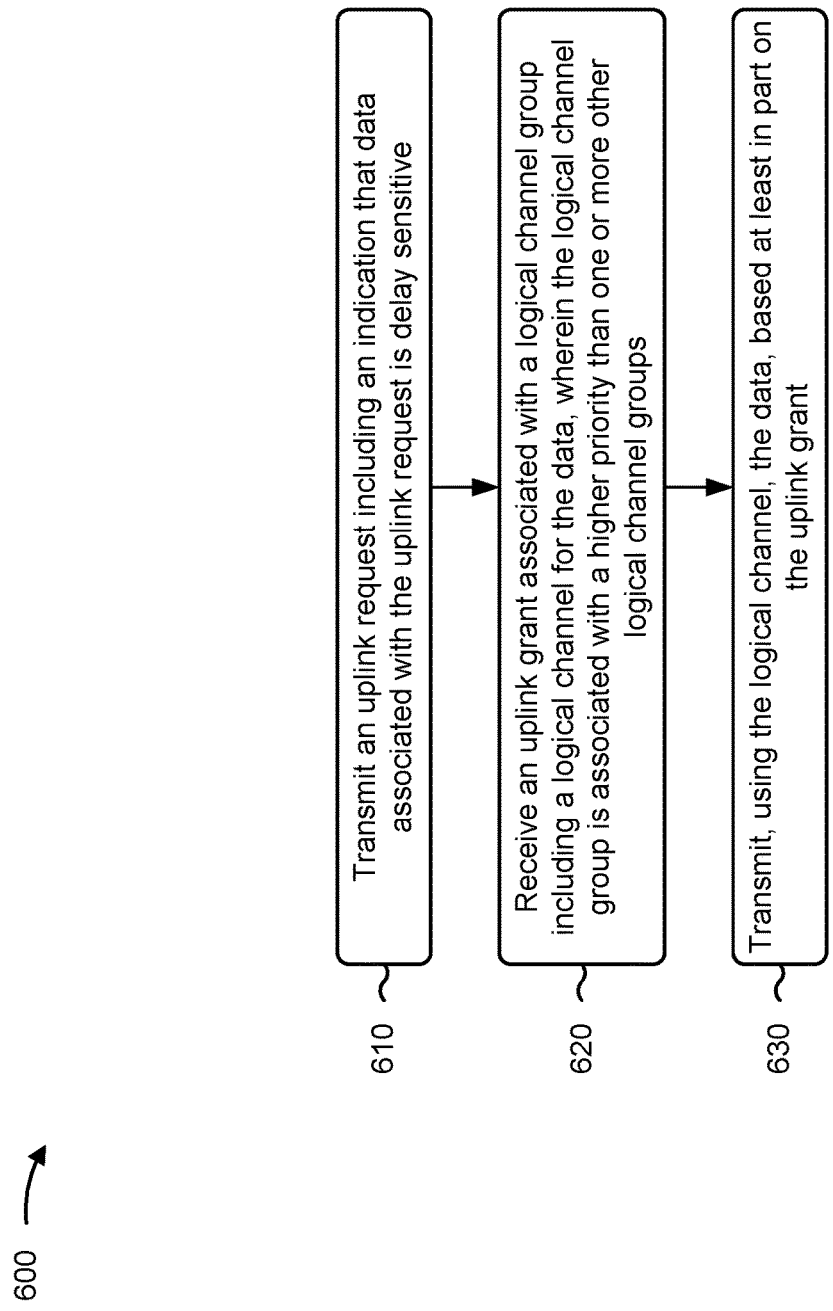
FIGS. 6 and 7 are diagrams illustrating example processes associated with transmitting and receiving delay sensitive uplink transmissions, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, apparatus 800 of FIG. 8, and/or the like) performs operations associated with transmitting delay sensitive uplink transmissions.

As shown in FIG. 6, in some aspects, process 600 may include transmitting, to a base station (e.g., base station 110, apparatus 900 of FIG. 9, and/or the like), an uplink request including an indication that data associated with the uplink request is delay sensitive (block 610). For example, the UE (e.g., using transmission component 804, depicted in FIG. 8) may transmit, to the base station, the uplink request including the indication that data associated with the uplink request is delay sensitive, as described above.

As further shown in FIG. 6, in some aspects, process 600 may include receiving, from the base station, an uplink grant associated with a logical channel group including a logical channel for the data (block 620). For example, the UE (e.g., using reception component 802, depicted in FIG. 8) may receive, from the base station, the uplink grant associated with the logical channel group including the logical channel for the data, as described above. In some aspects, the logical channel group is associated with a higher priority than one or more other logical channel groups.

As further shown in FIG. 6, in some aspects, process 600 may include transmitting, to the base station and using the logical channel, the data, based at least in part on the uplink grant (block 630). For example, the UE (e.g., using transmission component 804) may transmit, to the base station and using the logical channel, the data, based at least in part on the uplink grant, as described above.

Process 600 may include additional aspects, such as any single aspect or any combination of aspects described below and/or in connection with one or more other processes described elsewhere herein.

In a first aspect, the data has an associated survival time.

In a second aspect, alone or in combination with the first aspect, the uplink request includes a scheduling request.

In a third aspect, alone or in combination with one or more of the first and second aspects, the scheduling request is associated with a first data structure that is distinct from a second data structure associated with uplink requests for data that are not delay sensitive.

In a fourth aspect, alone or in combination with one or more of the first through third aspects, the scheduling request is associated with the logical channel.

In a fifth aspect, alone or in combination with one or more of the first through fourth aspects, the scheduling request includes a plurality of bits.

In a sixth aspect, alone or in combination with one or more of the first through fifth aspects, the scheduling request indicates at least one of the indication that the data is delay sensitive, a size associated with the data, or a time remaining for transmission of the data.

In a seventh aspect, alone or in combination with one or more of the first through sixth aspects, the scheduling request includes two or more bits that indicate the data is delay sensitive and a relative size associated with the data.

In an eighth aspect, alone or in combination with one or more of the first through seventh aspects, the scheduling request includes two or more bits that indicate a degree of delay sensitivity associated with the data.

In a ninth aspect, alone or in combination with one or more of the first through eighth aspects, the scheduling request is encoded (e.g., using encoding component 808, depicted in FIG. 8) according to a PUCCH format that includes two or fewer bits.

In a tenth aspect, alone or in combination with one or more of the first through ninth aspects, the scheduling request is encoded (e.g., using encoding component 808) according to a PUCCH format that includes more than two bits.

In an eleventh aspect, alone or in combination with one or more of the first through tenth aspects, the data is transmitted to the base station without transmitting a BSR.

In a twelfth aspect, alone or in combination with one or more of the first through eleventh aspects, the uplink grant includes a size based at least in part on a size associated with data previously transmitted using the logical channel.

In a thirteenth aspect, alone or in combination with one or more of the first through twelfth aspects, the data is associated with periodic uplink transmissions from the UE.

In a fourteenth aspect, alone or in combination with one or more of the first through thirteenth aspects, the uplink request includes a BSR.

In a fifteenth aspect, alone or in combination with one or more of the first through fourteenth aspects, the BSR includes a parameter indicating that the data is delay sensitive.

In a sixteenth aspect, alone or in combination with one or more of the first through fifteenth aspects, the parameter is configured using RRC.

In a seventeenth aspect, alone or in combination with one or more of the first through sixteenth aspects, the BSR includes at least one bit indicating that the data is delay sensitive.

In an eighteenth aspect, alone or in combination with one or more of the first through seventeenth aspects, the at least one bit is included with a buffer size indicated in the BSR.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
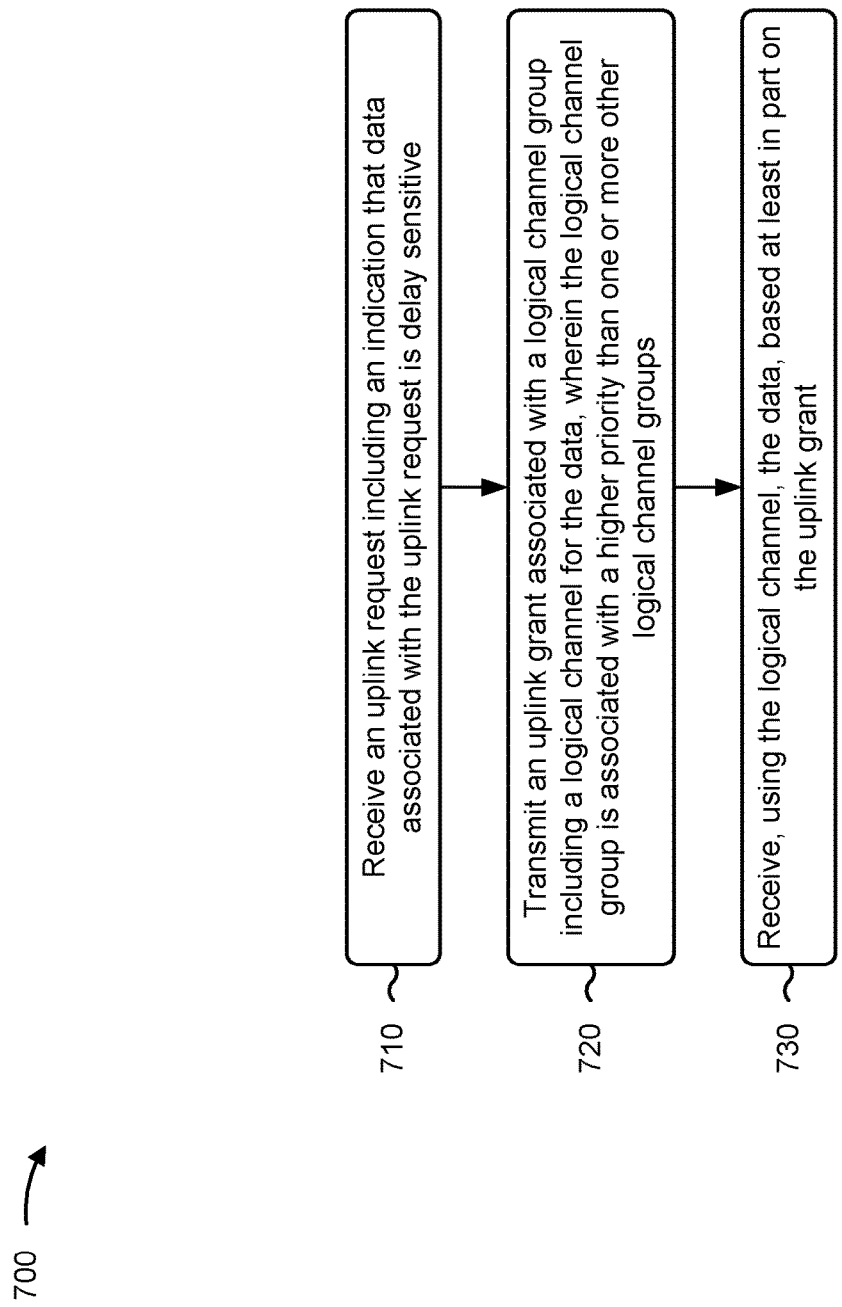

FIG. 7 is a diagram illustrating an example process 700 performed, for example, by a base station, in accordance with various aspects of the present disclosure. Example process 700 is an example where the base station (e.g., base station 110, apparatus 900 of FIG. 9, and/or the like) performs operations associated with receiving delay sensitive uplink transmissions.

As shown in FIG. 7, in some aspects, process 700 may include receiving, from a UE (e.g., UE 120, apparatus 800 of FIG. 8, and/or the like), an uplink request including an indication that data associated with the uplink request is delay sensitive (block 710). For example, the base station (e.g., using reception component 902, depicted in FIG. 9) may receive, from the UE, the uplink request including the indication that data associated with the uplink request is delay sensitive, as described above.

As further shown in FIG. 7, in some aspects, process 700 may include transmitting, to the UE, an uplink grant associated with a logical channel group including a logical channel for the data (block 720). For example, the base station (e.g., using transmission component 904, depicted in FIG. 9) may transmit, to the UE, the uplink grant associated with the logical channel group including the logical channel for the data, as described above. In some aspects, the logical channel group is associated with a higher priority than one or more other logical channel groups.

As further shown in FIG. 7, in some aspects, process 700 may include receiving, from the UE and using the logical channel, the data, based at least in part on the uplink grant (block 730). For example, the base station (e.g., using reception component 902) may receive, from the UE and using the logical channel, the data, based at least in part on the uplink grant, as described above.

Process 700 may include additional aspects, such as any single aspect or any combination of aspects described below and/or in connection with one or more other processes described elsewhere herein.

In a first aspect, the data has an associated survival time.

In a second aspect, alone or in combination with the first aspect, the uplink request includes a scheduling request.

In a third aspect, alone or in combination with one or more of the first and second aspects, the scheduling request is associated with a first data structure that is distinct from a second data structure associated with uplink requests for data that are not delay sensitive.

In a fourth aspect, alone or in combination with one or more of the first through third aspects, the scheduling request is associated with the logical channel.

In a fifth aspect, alone or in combination with one or more of the first through fourth aspects, the scheduling request includes a plurality of bits.

In a sixth aspect, alone or in combination with one or more of the first through fifth aspects, the scheduling request indicates at least one of the indication that the data is delay sensitive, a size associated with the data, or a time remaining for transmission of the data.

In a seventh aspect, alone or in combination with one or more of the first through sixth aspects, the scheduling request includes two or more bits that indicate the data is delay sensitive and a relative size associated with the data.

In an eighth aspect, alone or in combination with one or more of the first through seventh aspects, the scheduling request includes two or more bits that indicate a degree of delay sensitivity associated with the data.

In a ninth aspect, alone or in combination with one or more of the first through eighth aspects, the scheduling request is encoded according to a PUCCH format that includes two or fewer bits.

In a tenth aspect, alone or in combination with one or more of the first through ninth aspects, the scheduling request is encoded according to a PUCCH format that includes more than two bits.

In an eleventh aspect, alone or in combination with one or more of the first through tenth aspects, the data is transmitted to the base station without transmitting a BSR.

In a twelfth aspect, alone or in combination with one or more of the first through eleventh aspects, the uplink grant includes a size based at least in part on a size associated with data previously transmitted using the logical channel.

In a thirteenth aspect, alone or in combination with one or more of the first through twelfth aspects, the data is associated with periodic uplink transmissions to the base station.

In a fourteenth aspect, alone or in combination with one or more of the first through thirteenth aspects, the uplink request includes a BSR.

In a fifteenth aspect, alone or in combination with one or more of the first through fourteenth aspects, the BSR includes a parameter indicating that the data is delay sensitive.

In a sixteenth aspect, alone or in combination with one or more of the first through fifteenth aspects, the parameter is configured (e.g., using configuration component 908, depicted in FIG. 9) using RRC.

In a seventeenth aspect, alone or in combination with one or more of the first through sixteenth aspects, the BSR includes at least one bit indicating that the data is delay sensitive.

In an eighteenth aspect, alone or in combination with one or more of the first through seventeenth aspects, the at least one bit is included with a buffer size indicated in the BSR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
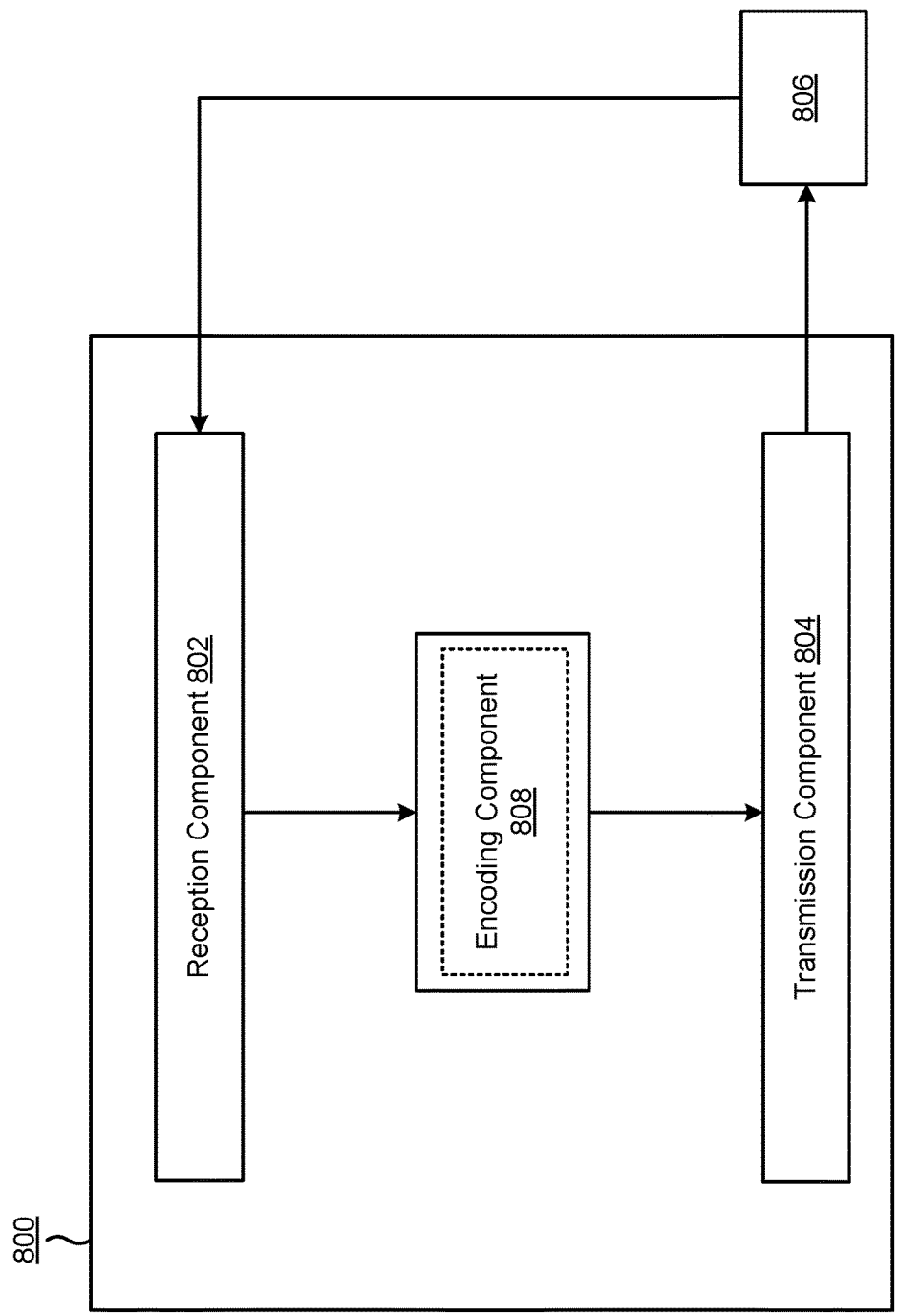
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an encoding component 808, among other examples.

In some aspects, the apparatus 800 may be configured to perform one or more operations described herein in connection with FIGS. 4-5B. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

In some aspects, the transmission component 804 may transmit, to the apparatus 806, an uplink request including an indication that data associated with the uplink request is delay sensitive. The reception component 802 may receive, from the apparatus 806, an uplink grant associated with a logical channel group including a logical channel for the data. In some aspects, the logical channel group is associated with a higher priority than one or more other logical channel groups. Accordingly, the transmission component 804 may transmit, to the apparatus 806 and using the logical channel, the data, based at least in part on the uplink grant.

In some aspects, the uplink request includes a scheduling request. Accordingly, the encoding component 808 may encode the scheduling request according to a first data structure that is distinct from a second data structure associated with uplink requests for data that are not delay sensitive. In some aspects, the encoding component 808 may include one or more antennas, a modulator, a transmit MIMO processor, a transmit processor, a controller/processor, a memory, or a combination thereof, of the UE described above in connection with FIG. 2.

In some aspects, the encoding component 808 may encode the scheduling request with a plurality of bits. For example, the scheduling request may include two or more bits that indicate the data is delay sensitive and a relative size associated with the data. Additionally, or alternatively, the scheduling request may include two or more bits that indicate a degree of delay sensitivity associated with the data. In some aspects, the encoding component 808 may encode the scheduling request according to a PUCCH format that includes two or fewer bits. As an alternative, the encoding component 808 may encode the scheduling request according to a PUCCH format that includes more than two bits.

In some aspects, the uplink request includes a BSR. Accordingly, the encoding component 808 may encode the BSR with a parameter indicating that the data is delay sensitive. Additionally, or alternatively, the encoding component 808 may encode the BSR with at least one bit indicating that the data is delay sensitive.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
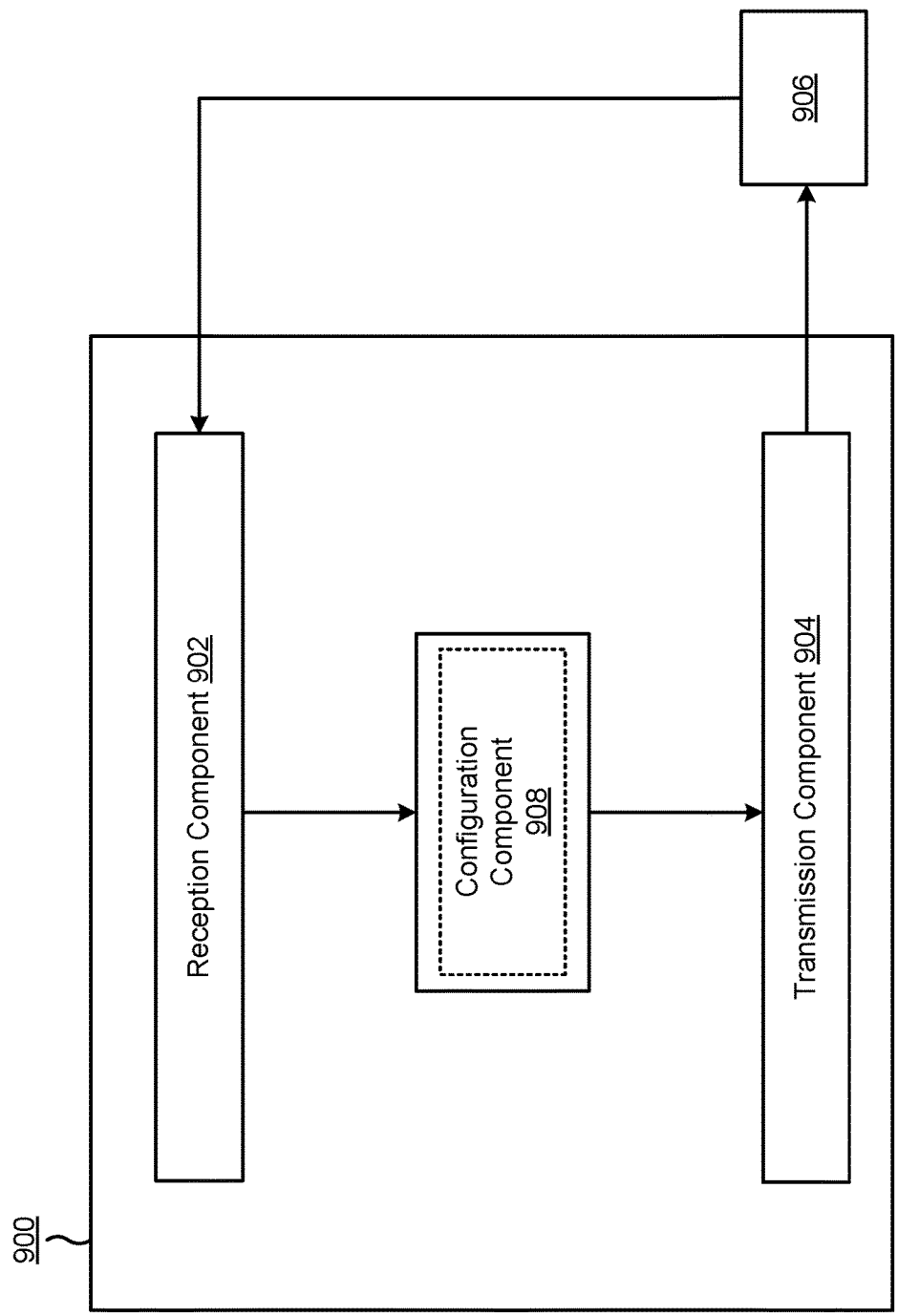

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a configuration component 908, among other examples.

In some aspects, the apparatus 900 may be configured to perform one or more operations described herein in connection with FIGS. 4-5B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

In some aspects, the reception component 902 may receive, from the apparatus 906, an uplink request including an indication that data associated with the uplink request is delay sensitive. The transmission component 904 may transmit, to the apparatus 906, an uplink grant associated with a logical channel group including a logical channel for the data. In some aspects, the logical channel group is associated with a higher priority than one or more other logical channel groups. Accordingly, the reception component 902 may receive, from the apparatus 906 and using the logical channel, the data, based at least in part on the uplink grant.

In some aspects, the uplink request includes a scheduling request. As an alternative, the uplink request includes a BSR. Accordingly, the configuration component 908 may configure (e.g., using RRC signaling and/or the like) a parameter to include in the BSR indicating that the data is delay sensitive. In some aspects, the configuration component 908 may include one or more antennas, a modulator, a transmit MIMO processor, a transmit processor, a controller/processor, a memory, or a combination thereof, of the base station described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, an uplink request including an indication that data associated with the uplink request has an associated survival time, wherein the associated survival time corresponds to at least one of:
   a period of time before a transition to a downtime or failure state; or
   a number of messages incorrectly received before the transition to the downtime or failure state;
   receiving, from the base station, an uplink grant associated with a logical channel group including a logical channel for the data, wherein the logical channel group is associated with a higher priority than one or more other logical channel groups; and
   transmitting, to the base station and using the logical channel, the data, based at least in part on the uplink grant.

2. The method of claim 1, wherein the uplink request includes a scheduling request.

3. The method of claim 2, wherein the scheduling request is associated with a first data structure that is distinct from a second data structure associated with uplink requests for data that are not delay sensitive.

4. The method of claim 2, wherein the scheduling request is associated with the logical channel.

5. The method of claim 2, wherein the scheduling request includes a plurality of bits.

6. The method of claim 5, wherein the scheduling request indicates at least one of:
   the indication that the data has an associated survival time,
   a size associated with the data, or
   a time remaining for transmission of the data.

7. The method of claim 5, wherein the scheduling request includes two or more bits that indicate the data has an associated survival time and a relative size associated with the data.

8. The method of claim 5, wherein the scheduling request includes two or more bits that indicate a degree of delay sensitivity associated with the data.

9. The method of claim 5, wherein the scheduling request is encoded according to a physical uplink control channel (PUCCH) format that includes two or fewer bits.

10. The method of claim 5 wherein the scheduling request is encoded according to a PUCCH format that includes more than two bits.

11. The method of claim 1, wherein the data is transmitted to the base station without transmitting a buffer status report (BSR).

12. The method of claim 1, wherein the uplink grant includes a size based at least in part on a size associated with data previously transmitted using the logical channel.

13. The method of claim 1, wherein the data is associated with periodic uplink transmissions from the UE.

14. The method of claim 1, wherein the uplink request includes a buffer status report (BSR).

15. The method of claim 14, wherein the BSR includes a parameter indicating that the data has an associated survival time.

16. The method of claim 15, wherein the parameter is configured using radio resource control.

17. The method of claim 14, wherein the BSR includes at least one bit indicating that the data has an associated survival time.

18. The method of claim 17, wherein the at least one bit is included with a buffer size indicated in the BSR.

19. A method of wireless communication performed by a base station, comprising:
    receiving, from a user equipment (UE), an uplink request including an indication that data associated with the uplink request has an associated survival time, wherein the associated survival time corresponds to at least one of:
        a period of time before a transition to a downtime or failure state; or
        a number of messages incorrectly received before the transition to the downtime or failure state;
    transmitting, to the UE, an uplink grant associated with a logical channel group including a logical channel for the data, wherein the logical channel group is associated with a higher priority than one or more other logical channel groups; and
    receiving, from the UE and using the logical channel, the data, based at least in part on the uplink grant.

20. The method of claim 19, wherein the uplink request includes a scheduling request.

21. The method of claim 20, wherein the scheduling request:
    is associated with a first data structure that is distinct from a second data structure associated with uplink requests for data that are not delay sensitive,
    is associated with the logical channel,
    includes a plurality of bits,
    or a combination thereof.

22. The method of claim 21, wherein the scheduling request indicates at least one of:
    the indication that the data has an associated survival time,
    a size associated with the data, or
    a time remaining for transmission of the data.

23. The method of claim 21, wherein the scheduling request includes two or more bits that indicate the data has an associated survival time and a relative size associated with the data.

24. The method of claim 21, wherein the scheduling request includes two or more bits that indicate a degree of delay sensitivity associated with the data.

25. The method of claim 21, wherein the scheduling request is encoded according to a physical uplink control channel (PUCCH) format that includes two or fewer bits.

26. The method of claim 21, wherein the scheduling request is encoded according to a PUCCH format that includes more than two bits.

27. The method of claim 19, wherein the data is transmitted to the base station without transmitting a buffer status report (BSR).

28. The method of claim 19, wherein the uplink grant includes a size based at least in part on a size associated with data previously transmitted using the logical channel.

29. The method of claim 19, wherein the data is associated with periodic uplink transmissions to the base station.

30. The method of claim 19, wherein the uplink request includes a buffer status report (BSR), and the BSR includes a parameter, indicating that the data has an associated survival time, that is configured using radio resource control.

31. The method of claim 30, wherein the BSR includes at least one bit indicating that the data has an associated survival time, and the at least one bit is included with a buffer size indicated in the BSR.

32. A user equipment for wireless communication, comprising:
    a memory; and
    one or more processors operatively coupled to the memory, the memory and the one or more processors configured to:
        transmit, to a base station, an uplink request including an indication that data associated with the uplink request has an associated survival time, wherein the associated survival time corresponds to at least one of:
            a period of time before a transition to a downtime or failure state; or
            a number of messages incorrectly received before the transition to the downtime or failure state;
        receive, from the base station, an uplink grant associated with a logical channel group including a logical channel for the data, wherein the logical channel group is associated with a higher priority than one or more other logical channel groups; and
        transmit, to the base station and using the logical channel, the data, based at least in part on the uplink grant.

33. A base station for wireless communication, comprising:
    a memory; and
    one or more processors operatively coupled to the memory, the memory and the one or more processors configured to:
        receive, from a user equipment (UE), an uplink request including an indication that data associated with the uplink request has an associated survival time, wherein the associated survival time corresponds to at least one of:
            a period of time before a transition to a downtime or failure state; or
            a number of messages incorrectly received before the transition to the downtime or failure state;
        transmit, to the UE, an uplink grant associated with a logical channel group including a logical channel for the data, wherein the logical channel group is associated with a higher priority than one or more other logical channel groups; and receive, from the UE and using the logical channel, the data, based at least in part on the uplink grant.

\* \* \* \* \*